United States Patent

Wood

[11] 4,032,170
[45] June 28, 1977

[54] KIT OF PARTS FOR A WELDED TRAILER HITCH

[76] Inventor: Leonard A. Wood, P.O. Box 750, North Bay, Ontario, Canada

[22] Filed: Oct. 15, 1975

[21] Appl. No.: 622,484

[30] Foreign Application Priority Data

Oct. 31, 1974 Canada .............................. 212800

[52] U.S. Cl. ............................................ 280/495
[51] Int. Cl.² ........................................ B60D 1/00
[58] Field of Search ............. 280/495, 496, 406 A, 280/407

[56] References Cited

UNITED STATES PATENTS

| | | | |
|---|---|---|---|
| 2,576,461 | 11/1951 | Kammerer | 280/495 |
| 2,639,160 | 5/1953 | Studebaker et al. | 280/495 |
| 2,889,155 | 6/1959 | Sandage | 280/495 X |
| 3,768,837 | 10/1973 | Reese | 280/495 |
| 3,843,165 | 10/1974 | Mathisen | 280/495 |

Primary Examiner—Joseph F. Peters, Jr.
Assistant Examiner—Michael J. Forman
Attorney, Agent, or Firm—Otto John Munz

[57] ABSTRACT

The invention provides a kit of parts, and a procedure for welding together such parts, to provide a strong trailer hitch for cars. The components of the hitch are such that they can be welded together in various different configurations so as to fit the large majority of cars, station wagons, pickup trucks and vans manufactured in North America. One feature of the hitch is that the socket member which receives the ball assembly is welded into a central tubular member forming part of a cross member of the hitch, and is weldable within this tubular member in different positions to suit required positioning of the ball member. Another feature is the use of two angled side members each having two legs the end portions of which are each sized so as to be insertable selectively into the outer ends of tubular arms which form the main part of the central cross member, the two legs of the angled side member being of differing lengths so that different hitch configurations are obtained by inserting a longer or shorter leg into the respective tubular arm of the cross member.

17 Claims, 11 Drawing Figures

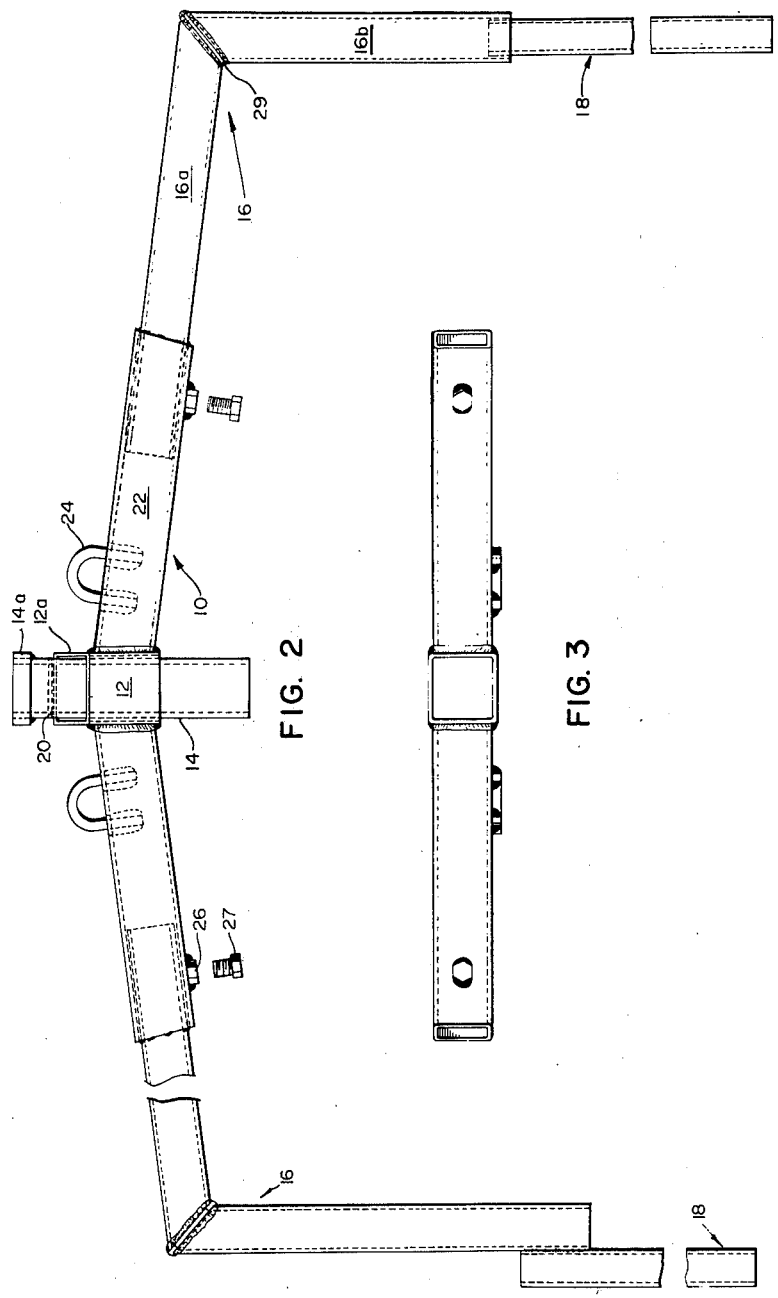

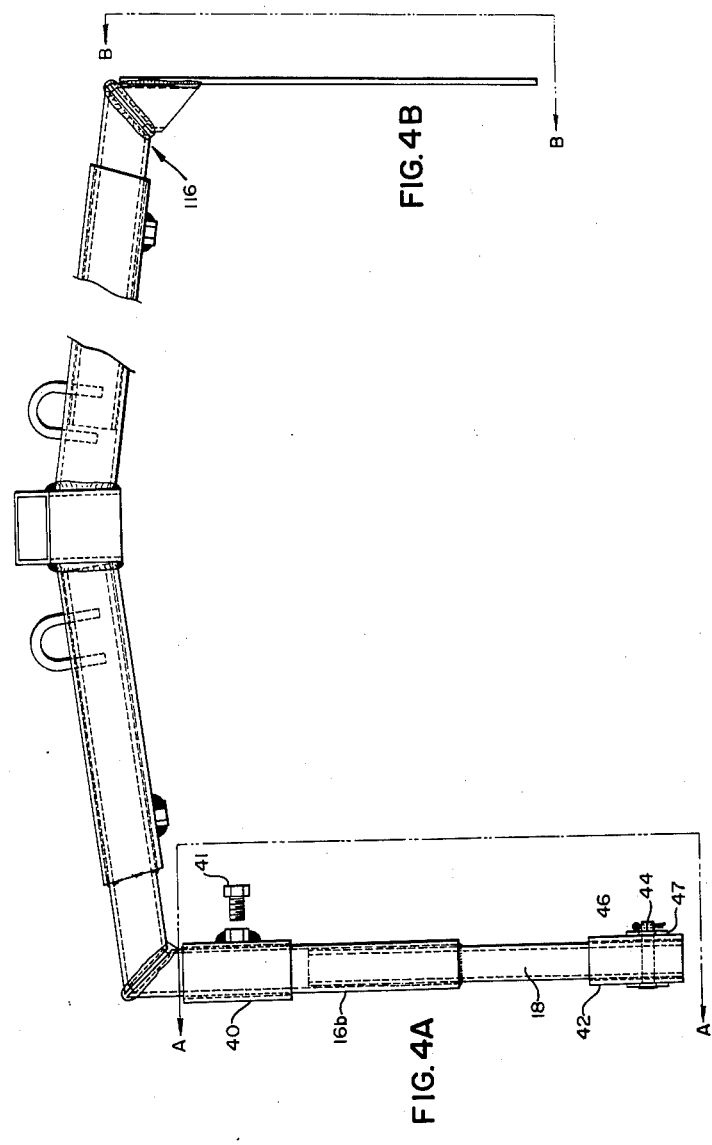

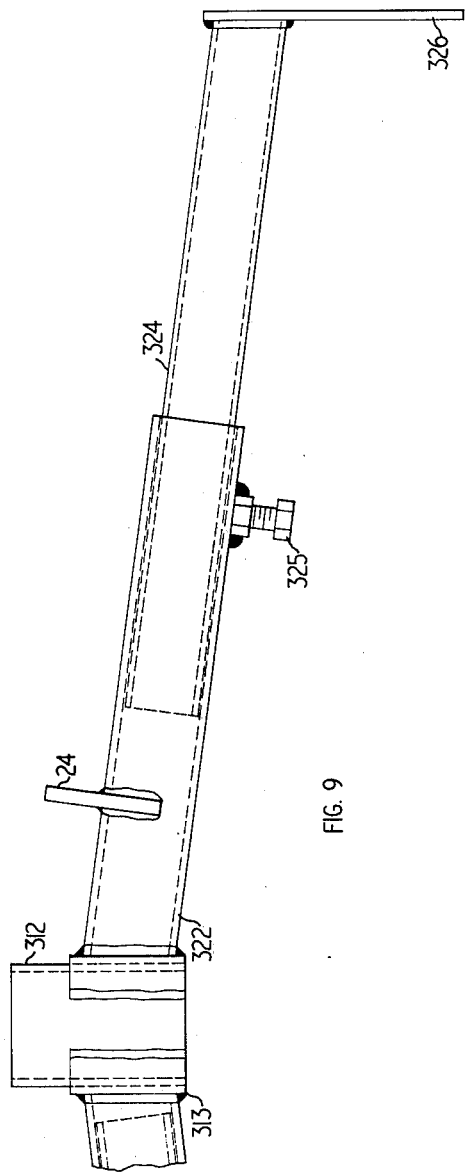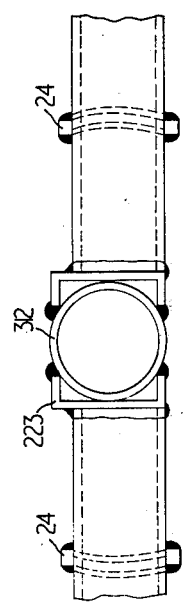

KIT OF PARTS FOR A WELDED TRAILER HITCH

This invention provides a kit of parts for an automobile trailer hitch, and a procedure for welding such parts together.

The hitch provided by this invention is a frame hitch, i.e. an assembly fixed to the rear of the vehicle chassis or frame (rather than the axle) and holding a socket member centrally underneath the rear bumper, this socket member being suitable for receiving a square bar carrying the ball member on which the trailer tongue rests.

A common form of known trailer hitches is a bolt-on assembly sometimes provided with a series of bolt holes so as to be adaptable to different automobiles. However, the adaptability of such assemblies is limited, and many different models are required even for fitting the standard range of North American cars. Furthermore, bolt-on hitches frequently develop some play, and of course looseness in the hitch is very undesirable for riding characteristics and safety.

Welded trailer hitches are also known. These are generally made of angle iron, often welded together in an improvised manner by a mechanic who is not a skilled welder. Welds done by such a person may not only cause the hitch to be insecurely attached to the frame, but may also seriously weaken the chassis as when welds are done transversely of a main chassis member.

The kit of parts provided by this invention allows a welded hitch to be produced which is intrinsically strong and which can readily be adapted to a wide variety of chassis shapes and sizes, without requiring awkward or weak welds to be performed. The various parts which will be described with reference to the drawings allow hitches to be made which can fit about 90 percent of cars and station wagons of North American design, and in this connection it may be mentioned that the term "automobile" is intended to include station wagons and pickup trucks and vans. The kit of this invention is intended to be welded together by a specialist welder following a set procedure to insure the best results.

A kit of parts in accordance with this invention comprises essentially a cross member including a central tubular part open at both ends and two symmetrically arranged arms extending from opposite sides of the tubular part and adapted to be connected by welding to the automobile frame, and a socket member sized to fit into the central tubular part and having a length more than twice its width and being weldable in the tubular part in a variety of axial positions.

The arms of the cross member are preferably tubular, and the kit of parts also preferably comprises two angled side members each having two legs the end portions of which are each sized so as to be insertable selectively into the outer ends of the tubular arms of the cross member, the legs being set at such an angle that with one leg inserted into one of the tubular arms the other leg is substantially parallel to the axis of the central tubular part and the two legs of each angled side member being of differing lengths so that different hitch configurations are obtained by inserting a longer or shorter leg into the respective tubular arm.

Further important parts of the kit are two front extension members which are sized to be insertable into that leg of each respective side member which is remote from the cross member.

The arms of the cross member, the angled side members, and the front extensions members are all preferably formed of square section tubing, although in certain designs round tubes may be used. The use of square section tubing however allows torsion forces to be transmitted between the cross member and the side members, so that the hitch is suitable for transmitting such forces which may be applied by a known type of "load-leveler" device, and, secondly, the square section tubing is very useful in that it allows the front extension members to be welded side by side to the outer leg of the side members, rather than only in telescopic relationship. This greatly increases the adaptability of the kit.

As indicated, the invention also includes a procedure for installing the trailer hitch, comprising the steps of:

supporting a cross member which comprises a central tubular steel part and two symmetrically arranged steel tubular arms extending from opposite sides of the tubular part in such a position in relation to an automobile that the tubular part is aligned in plan view with a central longitudinal axis of the automobile, and with said tubular arms extending in a horizontal plane adjacent the rear fender of the automobile, inserting into the outer end of each of said arms (either before or after positioning said cross member) a first leg of an angled side member having a second tubular leg extending forwardly of the automobile and being generally parallel to the axis of said central tubular part, adjusting the position of the first legs of each side member in the respective arm to bring the second legs of the side members close to the longitudinal chassis members of the automobile, and securing said second legs to the chassis members by welding connectors between said last mentioned members, fitting a front extension member in welding position relative to said second tubular leg of each of said side members, and securing said front extension members to the automobile frame by welding connectors therebetween, welding said front extension members securely to said second tubular legs of said side members, and securing said first legs of the side members to the respective arms of the cross member.

the invention will now be described by way of example with reference to the accompanying drawings, in which:

FIG. 2 is a top plan view of the main parts of an assembled hitch, the broken away left hand portion of this drawing showing a modified configuration in which the same parts may be welded;

FIG. 3 is an elevation view (looking from the front of the automobile towards the rear) of the cross member of the hitch;

FIGS. 4A and 4B are partial views of two further modified hitches;

Figure 5:
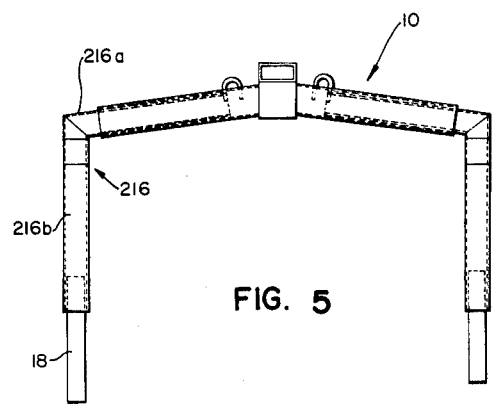
FIG. 5 is a plan view of a further modified hitch.
Figure 6:
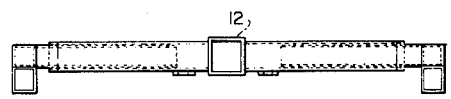
FIG. 6 is an elevational view (looking from the front towards the rear of an automobile) of the hitch shown in FIG. 5.
Figure 7:
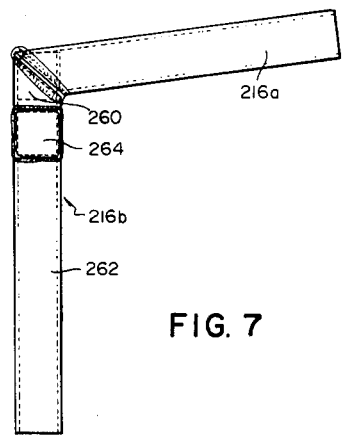
Figure 8:
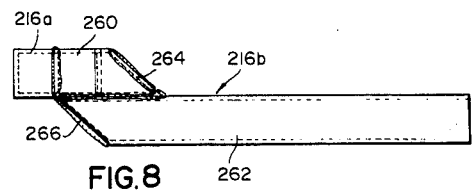

FIGS. 7 and 8 are respectively top plan views, and side elevations of a component of the hitch of FIGS. 5 and 6; and FIGS. 9 and 10 are respectively plan and front end views of a trailer hitch formed of round tubing.

Figure 1:
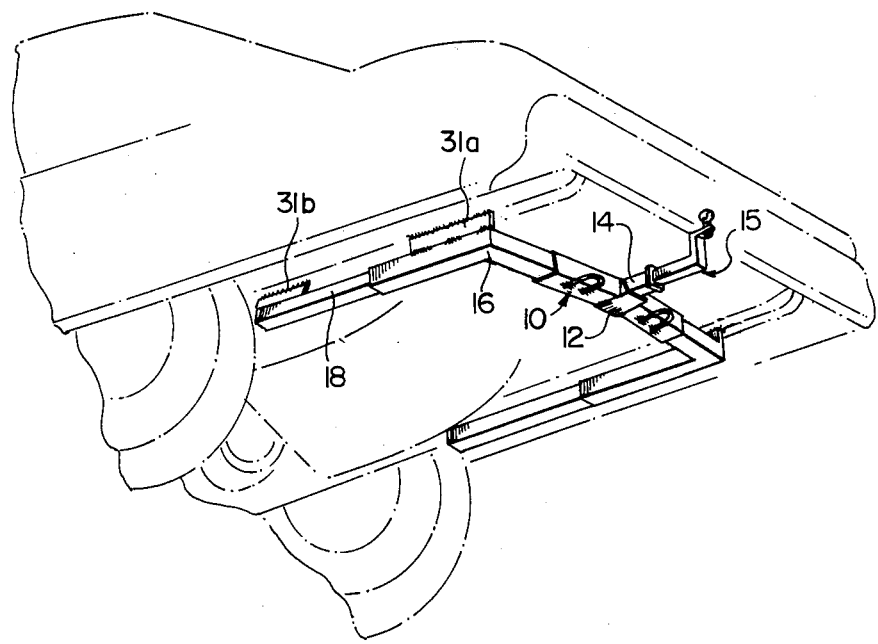
FIG. 1 is a perspective view of the rear of an automobile showing a hitch of this invention as installed.

The hitch shown in FIGS. 1 to 3 has as its main structural components a cross member 10 having a central tubular part 12 having a clear and straight opening therethrough and which receives a straight hollow socket member 14, two angled side members 16, and two front extension members 18. All these parts are formed of square mild steel tubing of 3/16 inch wall thickness, except for the socket member 14 which has a 1/4 inch wall thickness.

The central tubular part 12 of cross member 10 is of 3 inches square tubing having its outer end 12a inclined so that this member is shortest on its upper surface. Two symmetrically arranged arms 22 of 2½ inches square tubing are welded so as to extend outwardly from opposite sides of the part 12, these being inclined at an angle of about 7½° from the perpendicular to the axis of part 12, with the outer ends sloping away from the inclined face 12a of part 12. Each arm 22 has near the part 12 a loop of steel bar 24 welded to its under side, these being provided for connection of the safety chains connecting the hitch with the trailer. The outer ends of the arms 22 have small sockets 26 which receive set screws 27 capable of retaining in place the legs of the side members 16. As will be clear from what follows, the arms 22 provide the sole support for the tubular part 12 and are accordingly of suitable strength for providing the sole support for a trailer hitch member connected to this part.

The tubular part 12 is suitable for receiving the socket mmember 14 with a snug but slidable, telescoping fit, this socket member having a length several times (about 3 or 4 times) greater than its width, and being weldable within the tubular part 12 in various fore and aft positions depending on the desired relationship between cross member 10 and a ball carrying member 15 which, as shown in FIG. 1, fits into socket member 14. By reason of the length of the socket member this can be welded into the tubular member in a range of positions which is at least as great as the transverse dimension (or outer diameter) of the socket member. The socket member has a reinforcing flange 14a at its outer end. Also, near to the outer end member 14 has a cross bore 20 for receiving a pin which holds the bar of the ball member 15 in place.

The angled side members 16 comprise legs 16a, 16b of 2 inches square steel tubing welded together at 29 at such an angle (slightly greater than a right angle) that with an end portion of one leg 16a inserted into arm 22 (as shown in the right hand side of FIG. 2) the other leg 16b is parallel to the axis of the tubular part 12. The legs 16a and 16b are of unequal length, but are of the same cross sectional dimensions, and for example the legs may be 18 inches and 14 inches respectively. With the overall width of the cross member 10 from end to end of the arms 22 being about 30 inches, and with the 18 inch leg of each side member being inserted into the appropriate arm 22, the overall width of the hitch can be varied from 48 inches to 56 inches. With the shorter 14 l inches leg of each side member inserted into an arm 22 (as shown in the left hand side of FIG. 2), the overall width of the hitch can be varied from 33 to 48 inches.

The front extension members 18 are of 1½ inches square tubing, and can be fitted telescopically into that leg of the member 16 remote from the cross member 10. When fitted in this manner, the extension 18 is preferably welded to the leg by a 360° weld around the end of the leg.

The kit of parts will also generally include various connectors for weldably connecting the leg members 16a or 16b and front extension members 18 to the automobile frame. Most commonly, the connectors will be simple mild steel plates or brackets, such as plates 31 shown in FIG. 1, although other types of connectors will be described with reference to FIG. 4.

The procedure to be followed in welding the hitch to an automobile is as follows:

Firstly, depending on the frame width of the automobile, the appropriate legs of the side members 16 are inserted into the arms 22 of the cross member.

Then, with the car suitably raised, the cross member 10 and members 16 are supported by means of a supporting bar inserted into the tubular part 12, and this tubular part is brought into the final position required, i.e. such that the axis of this part is aligned in plan view with the central longitudinal axis of the automobile, and positioned so that a ball member 15 could be properly positioned in socket 14 when the parts have been assembled. In this position, arms 22 will be adjacent and below the rear fender. The position of the side members in the arms 22 is adjusted so that the longitudinally extending legs (or outer legs) (such as shown at 16b in the right hand side of FIG. 2) of the members 16 and the front extension members 18, are located close to suitable supporting frame members of the automobile. The set screws 27 can then be tightened to hold the side members 16 in place. The outer legs 16b are then fixed to the chassis by welding suitable brackets or plates 31a between the frame and the outer leg members.

Next, the front extension members 18 are inserted into the ends of the outer leg members, and suitably adjusted in position, and these are then connected to the frame by welding in place suitable further plates 31b (see FIG. 1). The front extension members 18 are then strongly welded in place in the outer legs of the side members by 360° welds, and the inwardly extending arms 16a of the side members are tack welded to the cross member. The latter welds do not have to sustain much force, and so can be a tack weld, although the welds between extension members 18 and arms 16 must be strong to take the axial force applied to the hitch.

Finally, the support is removed from the tubular member 12, and the socket member 14 is inserted into this, and adjusted to give the required position of the ball member 15, and is then strongly welded in place.

The hitch as assembled is used with a standard ball assembly having a square section bar which fits into the member 14, and which is held in position by a pin through bore 20.

The telescopic relationship between the outer leg of the side member 16 and the front extension member is preferred, particularly for ease of installation, but the use of square tubing for these parts has the further advantage in allowing the front extension member to be welded face to face relationship with the outer leg, for example as shown in the left hand side of FIG. 2. The member 18 can of course be welded to the bottom or top of the outer leg or to either side. Also, it is not necessary for the axis of the two members to be parallel as shown, but the front extension member could be set at an angle. It may be seen that there is considerable flexibility in the possible arrangements as so far described.

FIG. 4A shows part of a hitch assembly using parts which are all the same as those of the hitch assembly just described, with the exception of the connecting members which are of socket form, and which allow the hitch to be removed. The connectors include rear and front sleeves 40 and 42, the rear sleeve 40 being sized to receive the leg 16b of the side member, and socket 42 being sized to receive the front extension member 18. These sockets may be directly welded to the automobile frame, or connected thereto by brackets. The socket 40 is provided with a set screw 41 capable of acting on the leg 16b to hold this in place. The socket 42 is provided with a transverse bore, which matches a similar bore in the extension member 18, and which receives a rod 44 held in place by cotter pin 46 and washers 47. The rod 44 transmits most of the longitudinal force in the hitch to the vehicle frame, again requiring a strong weld between the leg 16b and member 18. The procedure for installing this modified hitch would be similar to that described above, except in that the sockets 40 and 42 would be fitted onto the respective hitch parts before this was positioned under the automobile frame.

In a further modification shown in FIG. 4B, the main length of the outer leg of the side member 116 is replaced by a 2½ × ¾ inch flat bar, 17½ inches in length which is connectable by welding to the vehicle frame.

FIGS. 5 to 8 show hitches generally similar to that described with reference to FIGS. 1 to 3, and having reversible side members, but which differ in that the legs of the side members are joined together in an offset manner so that (unlike with the embodiments of FIGS. 1 to 3) their axes are not co-planar. The side members 216 shown each include a first inner leg 216a which is a straight square tube, and an outer leg 216b which includes a short inner portion 260 of square tubing (best seen in FIGS. 7 and 8), and which is co-planar with the inner leg 216a, and which extends parallel to the tubular socket receiving part 12. A longer outer portion 262 of the outer leg has its upper surface welded to the lower surface of the part 260, and has an axis parallel to part 260. The overlapping ends of the portions 260 and 262 are cut away at an angle as shown, and closed by rectangular plates 264 and 266.

Many other variations using side members with offset legs are of course possible. Thus, the main outer portion of the leg 262 may be welded to the top of portion 260. Furthermore, mixed arrangements may be used, with one side member having co-planar legs and the other with legs off-set as shown in FIGS. 7 and 8.

In order to achieve the correct height of socket 14 in certain vehicles, this may be welded on the bottom of the tubular part 12. Also, the cross member 10 may be inverted and the socket 14 welded to the top of part 12, i.e. the longest surface of part 12.

FIGS. 9 and 10 show a form of trailer hitch made with round tubes. The central tubular part 312 is a piece of 2½ inches pipe, having a length of 4 ½ inches. This part 312 is connected to two inner arm portions 322 by means of two short channel sections 323, which extend parallel to the part 312 and which have the outer edges of their flanges welded to part 312 and which have their webs welded to the ends of pipes 322. The inner arm portions 322 each telescopingly receive an outer arm portion 324; and a set screw 325 is used to secure the outer arm in position, this being of course adjustable to suit the vehicle frame. Suitable materials for the inner and outer arm portions are 2 and 1½ inches standard steel pipe. The outer end of outer arm portion 324 has welded thereto a flat bar 326 which the example shown is ¼ inch thick, 3 inches wide, and 8 inches long.

The inner arm portion 322 carries the usual loops 24 for the connection of safety chains to the trailer. The tubular part 312 is of course adapted to receive a socket member, weldable therein in a variety of axial positions, and suitable for receiving the ball member of the hitch.

I claim:

1. A kit of parts for an automobile trailer hitch, comprising a cross member including a central tubular part and two symmetrically arranged tubular arms extending from opposite sides of said tubular part, and two angled side members each having two legs the end portions of which are each sized so as to be insertable selectively into the outer ends of the said tubular arms, said legs being set at such an angle that with one leg inserted into one of said tubular arms the other leg is substantially parallel to the axis of said central tubular part, and said two legs of each angled side member being of differing lengths so that different hitch configurations are obtained by inserting a longer or shorter leg into the respective tubular arm.

2. A kit of parts according to claim 1, wherein said two angled side members have tubular legs, said kit further comprising two front extension members each insertable into that leg of a respective side member remote from the cross member.

3. A kit of parts according to claim 2, wherein said angled side members and said front extension members are formed of square tubing, and are of weldable metal, whereby said front extension member can selectively be welded to a leg of said side member in several configurations including a telescopic relationship and a side-by-side relationship with a flat side of the front extension member contacting a flat side of a leg.

4. A kit of parts according to claim 2, further comprising metal plates weldable selectively to said side members and said front extension members and to the chassis of a car.

5. A kit of parts according to claim 2, further comprising socket connectors sized to receive fore and aft members of the hitch including the legs of said side members and the front extension members, said socket connectors for the front extension members and said front extension members themselves having corresponding cross bores for receiving holding pins.

6. A kit of parts according to claim 1, wherein the legs of said side members are joined to each other in offset manner so that their axes are in parallel spaced planes.

7. A kit of parts according to claim 6, wherein said side member includes a first, straight leg formed of square tubing; and a second leg which includes a short inner portion of square tubing welded at an angle to said first leg and having its axis co-planar with that of the first leg, and a longer outer portion of square tubing having an axis parallel with that of the first portion and being welded to said first portion with an outer surface thereof in contact with an outer surface of said inner portion.

8. A kit of parts according to claim 1, wherein said arms are hollow and wherein each arm is provided with a set screw threaded into the arm for engagement with a side member insertable into said arm.

9. A kit of parts according to claim 1, wherein each of said arms has connection means suitable for receiving the safety chains of a trailer.

10. A kit of parts according to claim 1, wherein each of said arms has welded thereto a loop of metal suitable for receiving the safety chains of a trailer.

11. A kit of parts for an automobile trailer hitch, comprising a cross member including a central tubular part having a clear and straight opening therethrough and two symmetrically arranged tubular arms extending from opposite sides of said tubular part, and a straight hollow socket member sized to fit into said central tubular part, said socket member having a length more than twice its width and being weldable in said tubular part in a variety of axial positions, and further comprising two angled side members each having two legs the end portions of which are each sized so as to be insertable selectively into the outer ends of said tubular arms, said legs being set at such an angle that with one leg inserted into one of said tubular arms the other leg is substantially parallel to the axis of said central tubular part, and said two legs of each angled side member being of differing lengths so that different hitch configurations are obtained by inserting a longer or shorter leg into the respective tubular arm.

12. A kit of parts according to claim 11, further comprising metal parts weldable to said side members and to the chassis of a car.

13. A kit of parts according to claim 11, further comprising socket connectors sized to receive fore and aft members of the hitch including the legs of said side members and the front extension members, said socket connectors for the front extension members and said rear extension members themselves having corresponding cross bores for receiving holding pins.

14. A kit of parts according to claim 11, wherein said tubular part and said socket member are both of square section tubing.

15. A kit of parts according to claim 11, wherein the socket member is weldable into the tubular part in preselected positions covering a range at least as great as the transverse dimension of the socket member.

16. A kit of parts for an automobile trailer hitch, comprising a cross member including a central tubular part of circular cross section and having a clear and straight opening therethrough, and two symmetrically arranged arms of equal length and having their inner ends welded to opposite sides of said tubular part, said arms being of suitable strength for providing the sole support for the hitch member of a trailer hitch when attached exclusively to said central tubular part, said inner ends of said arms being each provided with a channel member each channel member extending parallel to said tubular part and having its flanges welded to said tubular part and its web welded to a main elongated portion of one of said arms, and a straight hollow socket member sized to fit slidably into said central tubular part, said socket member having a length more than twice its width and greater than the overall length of said tubular part, said tubular part telescopingly surrounding said socket member when the socket member is positioned therein, said socket member being weldable in said tubular part in a plurality of preselected axial positions.

17. A method of installing a trailer hitch on an automobile comprising the steps of:

supporting a cross member which comprises a central tubular steel part and two symmetrically arranged steel tubular arms extending from opposite sides of said tubular part, in such a position in relation to an automobile that the tubular part is aligned in plan view with a central longitudinal axis of the automobile and with said tubular arms extending in a horizontal plane adjacent the rear fender of the automobile, inserting into the outer end of each of said arms (either before or after positioning of said cross member) a first leg of an angled side member having a second tubular leg extending forwardly of the automobile and being generally parallel to the axis of said central tubular part, adjusting the position of the first legs of each said side member in the respective arm to bring the second legs of the side members close to the longitudinal chassis members of the automobile, and securing said second legs to the chassis members by welding connectors between said last mentioned members, fitting a front extension member in welding position relative to said second tubular leg of each of said side members, securing said front extension members to the automobile frame by welding connectors therebetween, welding said front extension members securely to said second tubular legs of the side members, and securing the said first legs of the side members to the respective arms of the cross member.

* * * * *